(12) United States Patent
Thebault et al.

(10) Patent No.: US 10,270,943 B2
(45) Date of Patent: Apr. 23, 2019

(54) HUE CHANGING COLOR GAMUT MAPPING

(71) Applicant: INTERDIGITAL CE PATENT HOLDINGS, Paris (FR)

(72) Inventors: Cedric Thebault, Chantepie (FR); Jurgen Stauder, Montreuil/Ille (FR); Anita Orhand, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/739,769

(22) PCT Filed: Jun. 8, 2016

(86) PCT No.: PCT/EP2016/063062
§ 371 (c)(1),
(2) Date: Dec. 25, 2017

(87) PCT Pub. No.: WO2016/206981
PCT Pub. Date: Dec. 29, 2016

(65) Prior Publication Data
US 2018/0324329 A1 Nov. 8, 2018

(30) Foreign Application Priority Data
Jun. 25, 2015 (EP) .................................... 15305996

(51) Int. Cl.
*H04N 1/60* (2006.01)
*G06T 3/40* (2006.01)

(52) U.S. Cl.
CPC ......... *H04N 1/6066* (2013.01); *G06T 3/4007* (2013.01); *H04N 1/6058* (2013.01); *H04N 1/6075* (2013.01)

(58) Field of Classification Search
CPC .. H04N 1/6066; H04N 1/6075; H04N 1/6058; G06T 3/4007
See application file for complete search history.

(56) References Cited

U.S. PATENT DOCUMENTS 7,663,641 B2  2/2010  Sloan
8,026,953 B2  9/2011  Lammers et al.
(Continued)

FOREIGN PATENT DOCUMENTS

EP   0 611 230 A1 *  8/1994  .............. H04N 1/46
EP   0611230         8/1994
(Continued)

OTHER PUBLICATIONS

Morovic et al., "The Fundamentals of Gamut Mapping: A Survey", Journal of Imaging Science and Technology, vol. 45, No. 3, May/Jun. 2001, pp. 283-290.
(Continued)

*Primary Examiner* — Maurice L. McDowell, Jr.
*Assistant Examiner* — Donna J. Ricks
(74) *Attorney, Agent, or Firm* — Lily Neff

(57) ABSTRACT

An aspect of present principles is directed to methods and systems for gamut mapping source colors into target colors from a source color gamut towards a target color gamut. A difference may be determined source specific colors and corresponding target specific colors. A source hue of the source specific colors is adaptively changed towards a target hue of the corresponding target specific colors based on the difference to determine mapped specific colors. Color gamut mapping is performed for the source colors of the source color gamut towards the target color gamut based on the mapped specific colors. The specific colors are selected from primary colors, secondary colors, a group of primary colors and secondary colors. The difference is based on at least one
(Continued)

selected from the group of hue, saturation and lightness of the source specific colors and the corresponding target specific colors.

9 Claims, 12 Drawing Sheets

(56) References Cited

U.S. PATENT DOCUMENTS

| | | | | |
|---|---|---|---|---|
| 2002/0163669 | A1* | 11/2002 | Yamazaki | H04N 1/6058 358/3.23 |
| 2005/0248784 | A1* | 11/2005 | Henley | H04N 1/60 358/1.9 |
| 2006/0244983 | A1* | 11/2006 | Zeng | H04N 1/6058 358/1.9 |
| 2007/0223016 | A1 | 9/2007 | Ichitani | |
| 2007/0236761 | A1* | 10/2007 | Sloan | H04N 1/6058 358/520 |

FOREIGN PATENT DOCUMENTS

| | | | |
|---|---|---|---|
| EP | 0930776 | | 12/2008 |
| JP | 2006-345187 A | * | 12/2006 ............... H04N 1/46 |
| JP | 4223708 | | 2/2009 |
| JP | 2014229999 | | 12/2014 |

OTHER PUBLICATIONS

Anonymous, "Parameter values for the HDTV standards for production and international programme exchange", International Telecommunication Union, ITU-R Radiocommunication Sector of ITU, Recommendation ITU-R BT.709-6, Jun. 2015, pp. 1-19.

Anonymous, "Parameters values for ultra-high definition television systems for production and international programme exchange", International Telecommunication Union, ITU-R Radiocommunication Sector of ITU, Recommendation ITU-R BT.2020-1, Jun. 2014, pp. 1-8.

Ebner et al., "Development and Testing of a Color Space (IPT) with Improved Hue Uniformity", 6th IS&T/SID Color & Imaging Conference: Color Science, Systems, and Applications, Scottsdale, Arizona, USA, Nov. 17, 1998, pp. 8-13.

Green et al., "Extending the CARISMA Gamut Mapping Model", Journal of Imaging Science and Technology, vol. 46, No. 1, Jan. 2002, pp. 33-43.

Montag et al., "Psychophysical Evaluation of Gamut Mapping Techniques Using Simple Rendered Images and Artificial Gamut Boundaries",—IEEE Transactions on Image Processing, vol. 6, No. 7, Jul. 1997, pp. 977-989.

Zolliker et al., "On the Continuity of Gamut Mapping Algorithms", SPIE Electronic Imaging Conference 2005, San Jose, California, USA, Jan. 16, 2995, pp. 220-234.

* cited by examiner

HUE CHANGING COLOR GAMUT MAPPING

This application claims the benefit, under 35 U.S.C. § 365 of International Application PCT/EP16/063062, filed Jun. 8, 2016, which was published in accordance with PCT Article 21(2) on Dec. 29, 2016, in English, and which claims the benefit of European Application No. 15305996.9 filed Jun. 25, 2015.

TECHNICAL FIELD

The present invention relates to color processing of source colors. The present invention further relates to a hue changing color gamut mapping for changing a hue of the source colors towards a hue of the target colors.

BACKGROUND ART

One way of performing image and video processing color processing is known as color gamut mapping.

A "color gamut" is a set of colors. For example, a color gamut may be the set of: colors of real objects under real illumination; colors of image(s) reproduced for display on a monitor or by film projection; synthesized colors in an animated film (e.g., CGI animation); or any other colors visible by a human or by a light capturing apparatus. In practice, color gamuts may be defined by scene illumination, real objects, image capturing devices, image reproduction devices, color spaces, standards such as NTSC, ITU-R BT rec.709 ("rec. 709"), ITU-R BT rec. 2020 ("rec. 2020"), Adobe RGB, DCI-P3, or any other present or future standards for color reproduction or any other constraint(s) on color variety.

"Color gamut mapping" is the process of mapping or redistributing colors of a source color gamut ("source colors") to colors of a target color gamut ("target colors"). The source color gamut may be associated with any color gamut. Likewise, the target color gamut may also be associated with any color gamut. For example, a source color gamut may be associated with input image data and a target color gamut may be associated with a display device (e.g., a user device). Color gamut mapping may include changes to the saturation, hue, lightness, contrast or other aspects of colors, changes to blacks, whites or other color aspects of the source and/or target color gamut(s). For example, color gamut mapping may include tone mapping.

Color gamut mapping has important applications in the fields of image and video processing (e.g., video content production or post-production). For example, color gamut mapping is an important tool for color processing of video content (e.g., color gamut mapping may be utilized to ensure that a device's display constraints are met). Color gamut mapping may also be used to meet artistic requirements and/or as a tool by a colorist. Color gamut mapping may also be used to convert an original video into different video types for reproduction or transmission, such as for cinema, television, or the Internet. Color gamut mapping can also be used in a camera. For example, in the camera, color gamut mapping may be used to adapt a scene captured by the camera sensor to a given standard, so that the captured colors can be accurately reproduced (e.g., on a display device). The source camera gamut can be defined by the color filters of the camera sensor. Color gamut mapping might also be used in a display device to accurately display an image or video content. The target display gamut may be defined by the primary colors of the display panel. During processing, color gamut mapping may be repeated at various pixel frequencies.

Discussions of Color Gamut Mapping Include:
J. Morovic and M. R. Luo, "The Fundamentals of Gamut Mapping: A Survey", Journal of Imaging Science and Technology, 45/3:283-290, 2001.
Montag E. D., Fairchild M. D, "Psychophysical Evaluation of Gamut Mapping Techniques Using Simple Rendered Images and Artificial Gamut Boundaries", IEEE Trans. Image Processing, 6:977-989, 1997.
P. Zolliker, M. Dätwyler, K. Simon, On the Continuity of Gamut Mapping Algorithms, Color Imaging X: Processing, Hardcopy, and Applications. Edited by Eschbach, Reiner; Marcu, Gabriel G. Proceedings of the SPIE, Volume 5667, pp. 220-233, 2004.

Existing color gamut mapping methods are problematic because they result in a deterioration of the consistency of colors (e.g., a deformation of the neighborhood in the resulting target color gamut) after color gamut mapping. Such problems arise from the existing methods' compression or expansion of saturation and/or of hue and/or of lightness of colors in relation to the boundaries of the source and the target color gamuts. The lightness of a color may be specified by the L coordinate of the CIELAB color space, or Lab color space, such as defined by the CIE in 1976. Similarly the lightness may also be specified by the I coordinate of the IPT color space. For example, Ebner Fritz and Mark D. Fairchild, "Development and testing of a color space (IPT) with improved hue uniformity", Color and Imaging Conference in 1998 discusses lightness. However lightness, intensity or luminance could be used without change. The hue of a color can be obtained using psychophysical experiments. However different viewing conditions and/or different models can lead to different hue definitions. The hue of a color might be specified by a cylindrical angle of the cylindrical coordinate representation of the color space, for example in CIELAB color space. Alternatively hue may be obtained from the color coordinates using a formula (e.g. in a RGB color space, the hue might be defined by $$\text{hue} = \arctan\left(\frac{\sqrt{3}*(G-B)}{2*R-G-B}\right).$$

The boundary of a color gamut in a color space is a hull including all the colors of the color gamut.

A large part of existing color gamut mapping methods, known as cusp color gamut mapping, either compress or expand the saturation (or chroma) of colors and/or the lightness of colors in relation to a color gamut cusp. In color gamut mapping and notably in cusp color gamut mapping, non-uniform saturation modifications may occur when there is significant mismatch between primary colors defining the source color gamut and primary colors defining the target color gamut (e.g., misaligned cusp lines). Thus, the saturation gain induced by cusp color gamut mapping can be quite different for similar hues (for example for hue angle 75° the saturation gain may be 1.6 and while for hue angle 85° the saturation gain may be 1.2). This results in the problem of a degradation of the consistency of mapped colors in a color neighborhood.

Additional problems occur when a singular point (e.g. a primary or secondary color) in the cusp line of the source color gamut and the corresponding singular point in the cusp line of the target color gamut have different hues. The color neighborhood can degrade during cusp color gamut mapping when a singular point corresponds to a discontinuity of cusp line curvature. The negative impact on the color neighborhood may be even stronger if, while other conditions remain the same, the hues of corresponding singular points of the cusp lines of the source and target color gamuts, respectively, are close but not identical.

One reference that suffers from these problems is U.S. Patent Publication No. US2005/248784 to Henley et al. ("Henley"). Henley discloses a color gamut mapping method called shear mapping. The shear mapping maps in a constant-hue leaf in a color space, for example CIELAB color space, the cusp of the source gamut to the cusp of the target gamut. Henley discloses a hue rotation, which is performed as to maintain a maximum level of hue saturation. The hue rotation in Henley is a full hue rotation that maps the hue of each primary and secondary color of the input (the source color gamut) to the hue of a primary or a secondary color in the destination (the target color gamut). Full hue rotation mapping is also discussed by Green and Luo in their paper "Extending the CARISMA gamut mapping model" published at the conference Color Image Science in 2000. However, this full hue rotation results in the problem of significantly shifting hues.

SUMMARY OF INVENTION

An aspect of present principles avoids and provides solutions to the aforementioned problems.

An aspect of present principles is directed to changing the hue of source colors towards the hue of target colors based on a difference of saturation, of hue and/or of lightness between the source colors and the target colors.

An aspect of present principles is directed to a method for gamut mapping source colors into target colors from a source color gamut towards a target color gamut, comprising: determining a difference between source specific colors of the source color gamut and corresponding target specific colors of the target color gamut; adaptively changing a source hue of the source specific colors towards a target hue of the corresponding target specific colors based on the difference of the source specific colors and the target specific colors to determine mapped specific colors; performing color gamut mapping for the source colors of the source color gamut towards the target color gamut based on the mapped specific colors, wherein the specific colors are at least one selected from a group of primary colors, secondary colors, a group of primary colors and secondary colors, wherein the difference is based on at least one selected from the group of hue, saturation and lightness of the source specific colors and the corresponding target specific colors.

An aspect of present principles is directed to a system for gamut mapping source colors into target colors from a source color gamut towards a target color gamut, comprising: a processor configured to determine a difference between source specific colors of the source color gamut and corresponding target specific colors of the target color gamut; wherein the processor is further configured to adaptively change a source hue of the source specific colors towards a target hue of the corresponding target specific colors based on the difference of the source specific colors and the target specific colors to determine mapped specific colors and to perform color gamut mapping for the source colors of the source color gamut towards the target color gamut based on the mapped specific colors, wherein the specific colors are at least one selected from a group of primary colors, secondary colors, a group of primary colors and secondary colors, wherein the difference is based on at least one selected from the group of hue, saturation and lightness of the source specific colors and the corresponding target specific colors.

An aspect of present principles is directed to a non-transitory computer readable storage medium comprising a computer program including a set of instructions executable by a processor, the instructions configured to determine a difference between source specific colors of the source color gamut and corresponding target specific colors of the target color gamut; adaptively change a source hue of the source specific colors towards a target hue of the corresponding target specific colors based on the difference of the source specific colors and the target specific colors to determine mapped specific colors; perform color gamut mapping for the source colors of the source color gamut towards the target color gamut based on the mapped specific colors, wherein the specific colors are at least one selected from a group of primary colors, secondary colors, a group of primary colors and secondary colors, wherein the difference is based on at least one selected from the group of hue, saturation and lightness of the source specific colors and the corresponding target specific colors.

An aspect of present principles is further directed to the method, system or non-transitory computer readable storage medium, further including determining a Look Up Table, wherein the Look Up Table includes a mapping of input LUT colors to resulting LUT colors determined based on the color gamut mapping for the source colors of the source color gamut towards the target color gamut based on the adaptive change.

An aspect of present principles is further directed to the method, system or non-transitory computer readable storage medium, wherein the source color gamut and the target color gamut are in at least one color space selected from the group of Lab color space and IPT color space and wherein the adaptively changing includes rotating the source hue towards the target hue.

An aspect of present principles is further directed to the method, system or non-transitory computer readable storage medium, wherein an output color is determined based on the changed hue, and wherein the output color is represented in a first color space, and wherein the output color representation is changed from the first color space to another color space, wherein the another color space is at least one color space selected from the group of a RGB color space, YUV color space, and XYZ color space.

An aspect of present principles is further directed to the method, system or non-transitory computer readable storage medium, wherein the source specific colors are represented in a first color space, and wherein the source specific color is changed from the first color space to another color space, and wherein the another color space is at least one selected from the group of Lab color space and IPT color space.

An aspect of present principles is further directed to the method, system or non-transitory computer readable storage medium, wherein the specific colors are at least one selected from a group of a subset of the primary colors, a subset of the secondary colors, a subset of all the primary and secondary colors.

An aspect of present principles is further directed to the method, system or non-transitory computer readable storage medium, wherein the difference is determined between a saturation of the specific source color and a saturation of the target specific color.

An aspect of present principles is further directed to the method, system or non-transitory computer readable storage medium, wherein a stronger hue change is applied for smaller saturation differences.

An aspect of present principles is further directed to the method, system or non-transitory computer readable storage medium, wherein the difference is determined between a hue of the specific source color and a hue of the specific target color.

An aspect of present principles is further directed to the method, system or non-transitory computer readable storage medium, wherein a stronger hue change is applied for larger hue differences.

An aspect of present principles is further directed to the method, system or non-transitory computer readable storage medium, wherein the difference is determined between a lightness of the specific source color and a lightness of the specific target color.

An aspect of present principles is further directed to the method, system or non-transitory computer readable storage medium, wherein a stronger hue change is applied for larger lightness differences.

An aspect of present principles is further directed to the method, system or non-transitory computer readable storage medium, further comprising determining the hue of non-specific colors by interpolation of changed hue values of the mapped specific source colors.

An aspect of present principles is further directed to the method, system or non-transitory computer readable storage medium, wherein a hue rotation angle (θ) is defined as $$\theta = \alpha * \cos\left(\frac{\gamma - \beta}{2}\right)$$

wherein α ($\alpha = \overrightarrow{P_t OP_s}$) is the hue angle difference of a given specific color P, wherein β and γ are two other angles of the triangle $OP_sP_t$, and wherein the hue rotation angle (θ) increases (in absolute value) with decreasing difference of saturation between the specific source color ($P_s$) in the source color gamut and the corresponding specific target color ($P_t$) in the target color gamut An aspect of present principles is further directed to the method, system or non-transitory computer readable storage medium, wherein a hue rotation angle (θ) is defined as $$\theta = \alpha * \sin\left(2 * \arctan\left(\frac{S_t}{S_s}\right)\right) * \sin|\alpha|$$

wherein variable $S_s$ is a saturation of a specific source color of the source color gamut $P_s$ and variable $S_t$ is the saturation of the corresponding specific target color of the target color gamut $P_t$.

An aspect of present principles is applicable to any device that is configured to include the feature of color gamut mapping, such as cameras, displays, transmission systems (e.g., converting between different color gamut mapping standards), professional encoders, professional decoders, set-top boxes, video player, video recorder, or video game consoles.

BRIEF DESCRIPTION OF DRAWINGS

The invention will be more clearly understood on reading the description which follows, given by way of non-limiting example and with reference to the appended figures in which.

DESCRIPTION OF EMBODIMENTS

Figure 1:
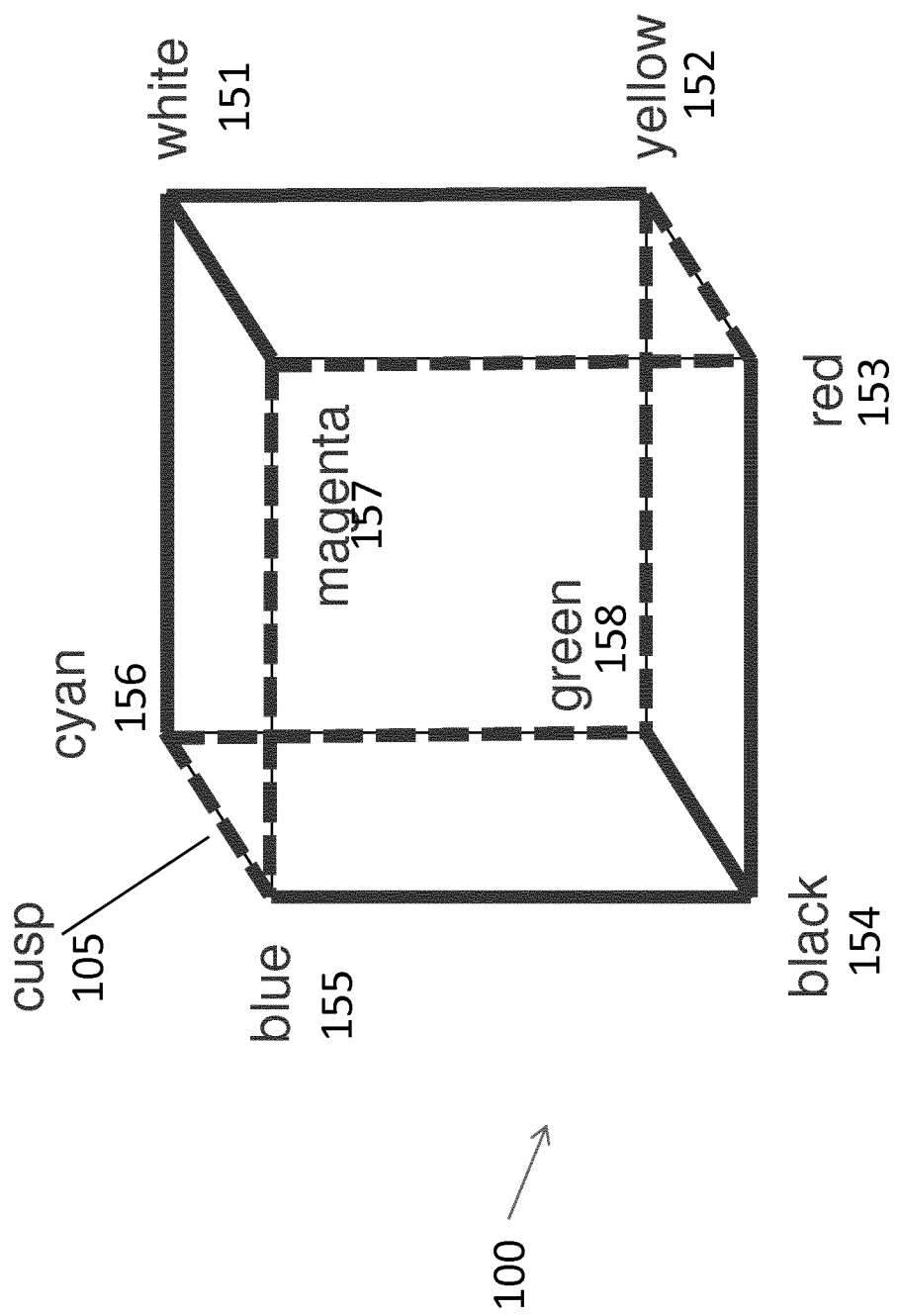
FIG. 1 illustrates an exemplary color gamut in the RGB color space.

Color gamut mapping includes a gamut boundary description (GBD). The GBD defines the boundary surface, or hull, of a color gamut in a color space. GBDs often comprise of explicit, generic 3D representations such as triangle meshes or volume models. For example, a GBD of a color gamut can be based on a mesh of triangles, each triangle being defined by its three vertices in the color space of this GBD. These vertices are colors located on the boundary of the color gamut.

Colors as well as GBD(s) are usually represented in a color space, although not necessarily in the same color space. A color space is a space where colors can be represented by color coordinates. A color space may correspond with a type of display or with an input source (e.g., a camera). The same color gamut can be represented in different color spaces (RGB, Lab, IPT . . . ). However a color gamut represented in different color spaces usually has a different shape in each of those different color spaces. A type of color space is a three-dimensional space that includes a lightness—L-axis, a chroma—C-axis, and a hue—h-axis. In some color spaces (such as Lab or IPT), hue may be defined as the angular component of the cylindrical representation of the color space.

The cusp of a color gamut is a set of colors, where each color has a larger chroma (i.e. saturation) compared to all other colors being in the same constant-hue leaf of a 3D color space and being within the color gamut. The constant-hue leaf expands along a lightness (L) axis and a chroma (C) axis. When a color gamut is described by a GBD based on discrete surface elements such as triangles, the cusp includes singular points (vertices) or lines (edges) on the boundary surface that limits a color gamut. For a color gamut of a trichromatic, additive display, the cusp usually includes the primary colors red, green, blue and the secondary colors yellow, magenta, cyan. The primary and secondary colors are in at least one of the color channels of the input of the display at either the minimum or at maximum levels. The cusp of a color gamut can be modeled using a gamut boundary description based on mesh of triangles where the cusp is a closed polygon based on vertices of some triangles. Cusp colors corresponding to these vertices are generally defined as the in-gamut color of maximum chroma in a given constant-hue leaf.

The cusp line of a color gamut is a line joining cusp colors. When the color gamut is represented in a color space having a measure for chroma (e.g., Lab color space or JCh color space according to the CIECAM-02 model defined by the CIE in 2002, or IPT color space as defined by Ebner Fritz and Mark D. Fairchild in their paper "Development and testing of a color space (IPT) with improved hue uniformity" published at the conference Color and Imaging Conference in 1998), a cusp color corresponds to the color of maximum chroma (i.e. maximum saturation) in a plane defined by a constant hue. The chroma (i.e. the saturation) of a color can be obtained from human observers using psycho-physical experiments. However different viewing conditions and/or different models can lead to different chroma (i.e. saturation) definitions. For example, in the Lab color space (respectively in the IPT color space), chroma (i.e. saturation) is defined to be the square root of the sum of the squares of a and b (respectively P and T). A plane defined by a constant hue is generally named "constant hue leaf". More generally, cusp colors often correspond to singular points ("vertices") or singular lines ("edges") on the boundary surface that limits a color gamut. The cusp line of a color gamut can be generally modeled as a line forming a closed polygon on the gamut boundary of this color gamut.

A color gamut mapping method (or gamut mapping algorithm) may map the colors from a source color gamut (having its own source cusp points or source cusp line) to a target color gamut (having also its own target cusp points or destination cusp line). In order to take advantage of the range of colors in the target gamut, the gamut mapping method may map a source cusp point/line into the target cusp point/line. Such gamut mapping algorithms are known as cusp gamut mapping algorithms.

FIG. 1 illustrates an example of a color gamut 100 in the RGB color space. The color gamut 100 of FIG. 1 may be the color gamut of a trichromatic display or a trichromatic camera. The color gamut 100 corresponds to the cube (the inside and the surface) shown in FIG. 1.

As shown in FIG. 1, RGB color gamut 100 includes a cusp line 105. The cusp line 105 is the dotted line forming a closed polygon, corresponding to the set of lines linking the primary colors to the secondary colors. The cusp line 105 is composed of singular lines linking each primary color of the display (for example red 153, green 158 and blue 155) with a secondary color (for example yellow 152, magenta 157 and cyan 156) that has that primary color as a component. For example, the cusp line 105 may link colors as follows: red 153 with yellow 152, red 153 with magenta 157, green 158 with yellow 152, green 158 with cyan 156, blue 155 with cyan 156 and blue 155 with magenta 157. The cusp line 105 is shown by dotted lines in FIG. 1.

Figure 2:
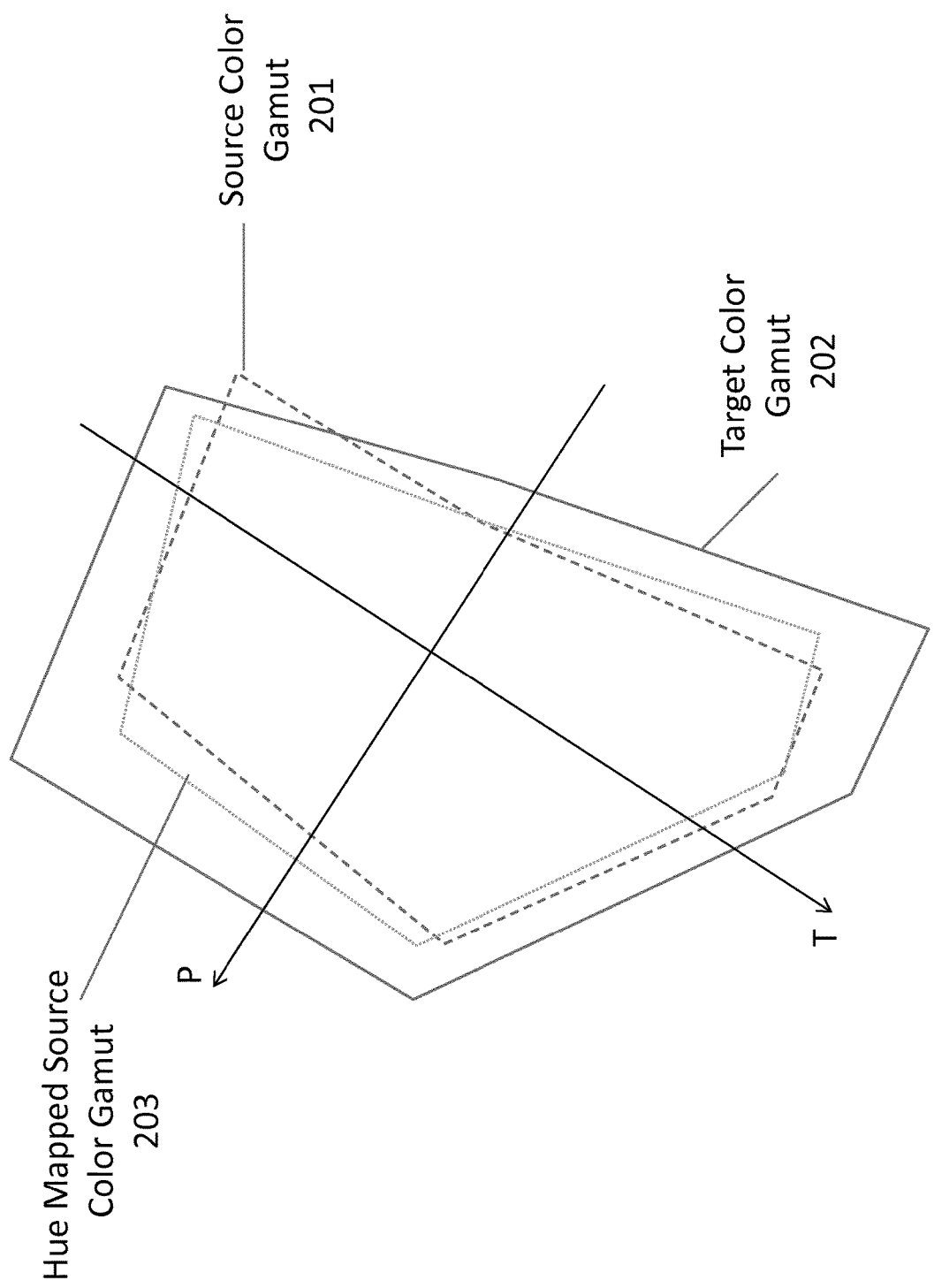
FIG. 2 illustrates an exemplary hue rotation mapping.

FIG. 2 illustrates an example of a hue rotation color gamut mapping in the IPT color space. FIG. 2 includes the cusp of a source color gamut 201, the cusp of a target color gamut 202, and the cusp of a hue mapped source gamut 203 using full hue rotation. The P and T axes are the two chromatic axis of the IPT color space. The hue mapped source gamut 203 is the result of aligning the hue of the primary and the secondary colors of the source color gamut 201 with the hue of the respective primary and the secondary colors of the target color gamut 202, thereby providing full hue rotation.

Figure 3:
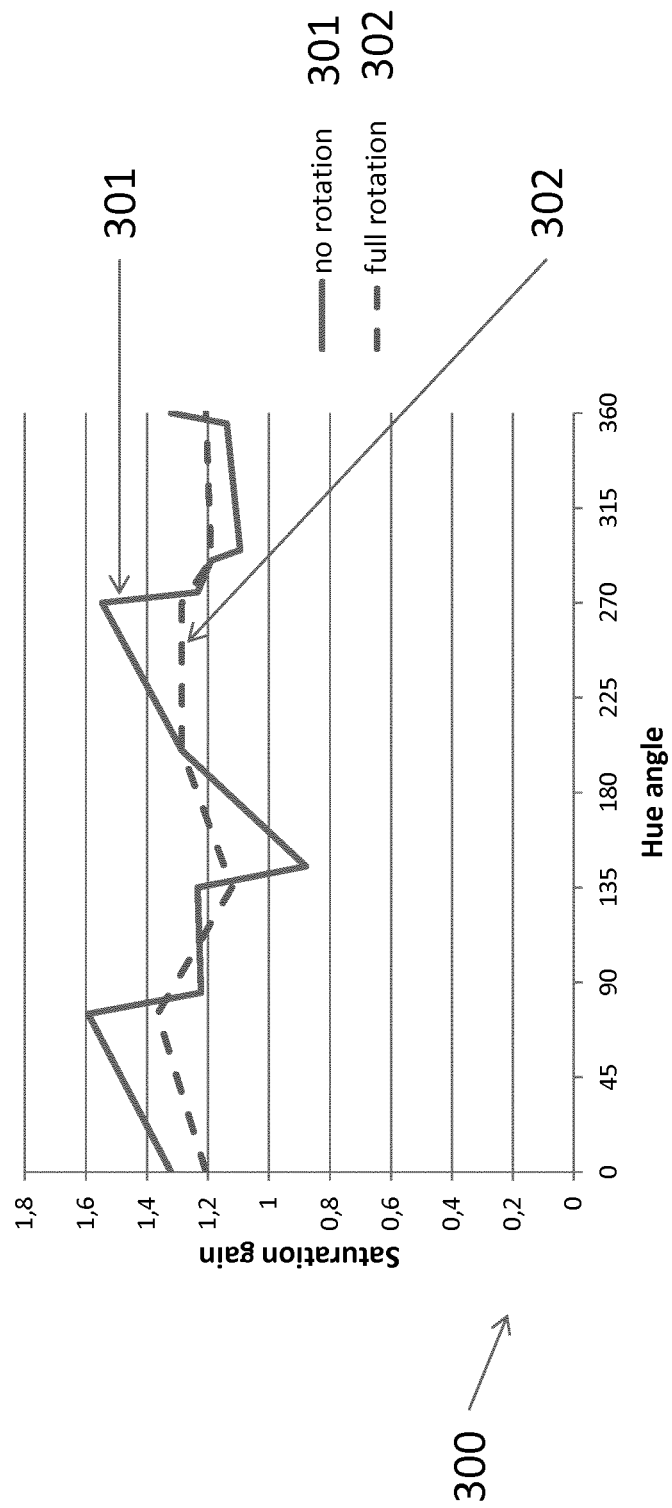
FIG. 3 illustrates an exemplary plot diagram of saturation gain.

FIG. 3 illustrates an exemplary plot diagram 300 illustrating saturation gain resulting from cusp color gamut mapping with or without the full hue rotation. As used herein, the saturation gain may be defined as a ratio of color saturation before and after color gamut mapping. For example when using cusp color gamut mapping, the saturation gain of the cusp points of the source color gamut may correspond to the ratio between the saturation of the cusp point in the source color gamut and the saturation of the cusp point having the same hue in the target color gamut.

The plot diagram 300 illustrates the change of saturation (i.e., saturation gain) that is induced by cusp color gamut mapping. The vertical axis of the plot diagram 300 pertains to a ratio of saturation gain. The horizontal axis of the plot diagram 300 pertains to hue angle measured in degrees. The plot diagram 300 includes a plot line 301 that demonstrates the saturation gain versus hue angle when there is no hue rotation. Plot line 301 relates to mapping the source color gamut to the target color gamut (using a cusp mapping without hue rotation). The plot diagram 300 further includes a plot line 302 that demonstrates the saturation gain versus hue angle when there is a full hue rotation. Plot line 302 relates to mapping the source color gamut (using a cusp mapping with full hue rotation) to the target color gamut.

Figure 4:
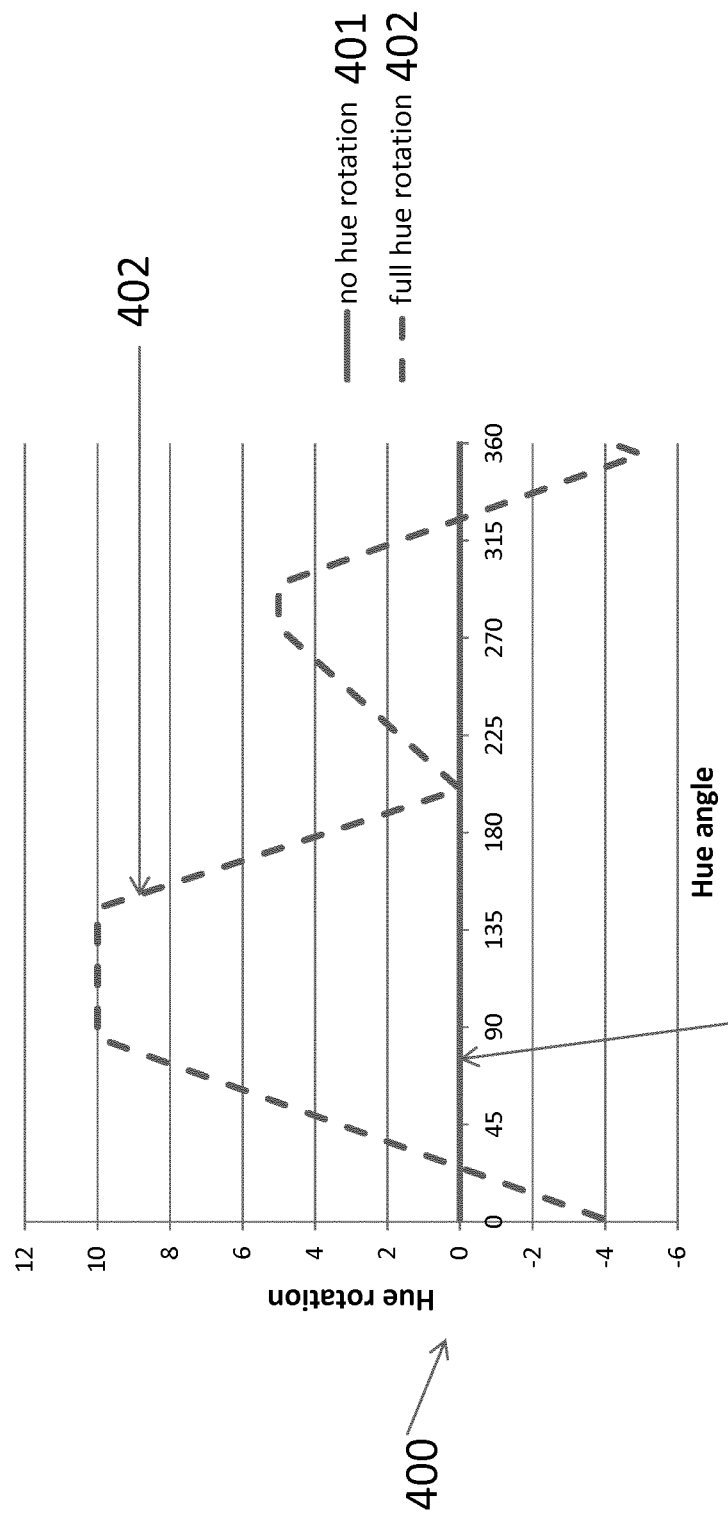
FIG. 4 illustrates an exemplary plot diagram of hue rotation.

FIG. 4 illustrates an exemplary plot diagram 400 of hue rotation resulting from a color gamut mapping with or without the full hue rotation. The plot diagram 400 illustrates the hue rotation (change of hue) that is induced by full hue rotation mapping of the source color gamut to the target color gamut. The vertical axis of the plot diagram 400 pertains to hue rotation angle in degrees. The horizontal axis of the plot diagram 400 pertains to hue angle in degrees. The plot diagram 400 includes a plot line 401 that demonstrates the hue rotation angle versus hue angle when there is no hue rotation. The plot diagram 400 further includes a plot line 402 that demonstrates the hue rotation angle versus hue angle when there is a full hue rotation. As shown in FIG. 4, most of the colors get shifted by a large amount when there is full hue rotation. As can be seen from FIGS. 3 and 4, while full hue rotation effectively improves the uniformity of the saturation gain, full hue rotation also results in the colors getting shifted.

An aspect of present principles relates to mapping of the hue of a source color gamut. An aspect of present principles is directed to hue mapping. An aspect of present principles is directed to mapping the source color gamut towards, but not necessarily into, the target color gamut. For example, the hue of the colors in the source color gamut may be modified such that the resulting color gamut is closer to the target color gamut. However, after the hue mapping, some colors of the modified source color gamut might still lie outside of the target color gamut and/or the target color gamut might not be completely covered by the modified source color gamut. The source colors may then need to be further mapped towards the target color gamut so that all modified source colors lie inside the target color gamut and/or the target color gamut is completely covered by the modified source color.

In one example of present principles, the hue mapping may exclude or may include other mapping processes, such as cusp color gamut mapping. In one example, cusp gamut mapping is applied after hue mapping, thereby minimizing color neighborhood degradation.

An aspect of present principles is a method for color gamut mapping such that the source color gamut is changed or modified towards the target color gamut. An aspect of present principles is directed to hue mapping based on mapping of the hue of primary and secondary colors of the source gamut towards the hue of the corresponding primary and secondary colors of the target color gamut. An aspect of present principles is directed to adaptively changing a source hue of primary and secondary colors towards a target hue of the corresponding target primary and secondary colors.

As used herein, "corresponding" colors of a target color gamut correspond to the primary or secondary color of the source color gamut. For example, the 'red' color of the target color gamut is the target color corresponding to the 'red' of the source color gamut in the target color gamut. These two different 'reds' are corresponding specific colors. Alternatively, the corresponding color of a target color gamut can refer to the specific color of the target color gamut with the closest hue to the specific color of the source color gamut.

An aspect of present principles is directed to a hue mapping in a color space, this color space being characterized in that the hue of a color is represented by a cylindrical angle and the lightness of a color by the coordinate on the longitudinal axis of the cylindrical coordinate representation of the color space. The hue mapping includes a rotation of the cusp points of the source color gamut around the lightness axis. The rotation of each cusp points defines a rotation of each hue leaf containing said cusp point. In one example, the angle of rotation varies with the hue.

An aspect of present principles is directed to a method for controlling the modification of the hue of specific colors of the source color gamut towards the hue of the corresponding specific color of the target color gamut based on the difference of either hue, saturation and/or lightness of the corresponding specific colors. The difference is determined between the hue (saturation or lightness) of a specific color in the source color gamut and the hue (saturation or lightness) of the corresponding color in the target color gamut.

An aspect of present principles is directed to rotating or changing specific colors (e.g., primary colors and optionally secondary colors) of a source color gamut towards a target color gamut. The rotation may be based on a difference between the saturation of colors of the source color gamut and the saturation of colors of the target color gamut. The rotation may also be based on a difference between the hue angle of colors of the source color gamut and the hue angle of colors of the target color gamut. The specific colors may be rotated in the ab plane in Lab color space or PT space in IPT color space. The rotation may then be applied to modify source colors represented in any color space (e.g., RGB, YUV).

An aspect of present principles relates to applying a rotation of the source hues depending on the differences of saturation of the source and target specific colors (primary and/or secondary colors). In one example, for each specific color (e.g., for each primary and/or for each secondary color), a stronger hue rotation is applied for smaller saturation differences.

An aspect of present principles relates to applying a rotation of the source hues depending on the differences of hue angle of the source and target specific colors (primary and/or secondary colors). In one example, for each specific color (e.g., for each primary and for each secondary color), a stronger hue rotation is applied for larger hue angle differences.

An aspect of present principles is directed to a method for mapping in a color space colors of a source color gamut towards colors of a target color gamut, where for hue, saturation and lightness can either be directly represented by a coordinate of the color space or obtained from the coordinates of the color space.

An aspect of present principles relates to color gamut mapping comprising of hue mapping source colors into mapped source colors by modifying the hue of source color gamut according to hue, saturation and/or lightness differences. An aspect of present principles is further directed to mapping hue mapped source colors into target color gamut using cusp mapping.

Hue rotation for colors other than specific colors (e.g., primary and/or secondary colors) may be determined based on hue rotation angles determined for the specific colors. For example, hue rotation angles for non-specific colors can be obtained by interpolation of the hue rotation angles of the specific colors. Alternatively, hue rotation angles may be applied for specific colors, and the hue value may be interpolated for non-specific colors. For example, in any color space (e.g., RGB, YUV, LAB, IPT), the hue may be evaluated for specific colors (e.g., by adaptively rotating or changing the source hue of the source specific colors). The hues of the remaining non-specific colors may then be interpolated (e.g., estimated) based on the resulting hues of the specific colors.

An aspect of present principles allows for an improvement in uniformity of the saturation gain induced by color gamut mapping, while accounting for potential hue modifications. An aspect of present principles relates to a method that not only improves the uniformity of the saturation gain—thereby minimizing the color neighborhood degradation—but also minimizes the average change of hue. An aspect of present principles is directed to the preservation of the color neighborhood, which includes maintaining the uniformity of features of the source colors (e.g., lightness, chroma or hue) after mapping towards the target color gamut. In one example, an aspect of present principles is directed to hue rotation angles smaller than the full hue rotation angle. In one example, the range of hue rotation is between 0 (no rotation) and the hue angle difference between the specific colors in the source and the corresponding specific colors in the target (alignment of the source primary color hue to the hue of the target primary color).

The method can be applied to the primary colors only or advantageously to the primary and the secondary colors. The other colors of the source gamut are also rotated using a linear interpolation of the hue rotation angles of the adjacent primary (and advantageously the secondary) colors. Thus, in the simplest implementation, the rotation angle is a piecewise linear function of hue. In one example, the method is applied to the projection of the cusp on the color plane (ab plane in Lab space, PT plane in IPT space). However it may be possible to apply this, without modification, to the 3D cusp using angles measured in the 3D color space. In this particular case, the hue change might depend on third coordinate (i.e. the lightness, the intensity or the luminance).

Figure 5:
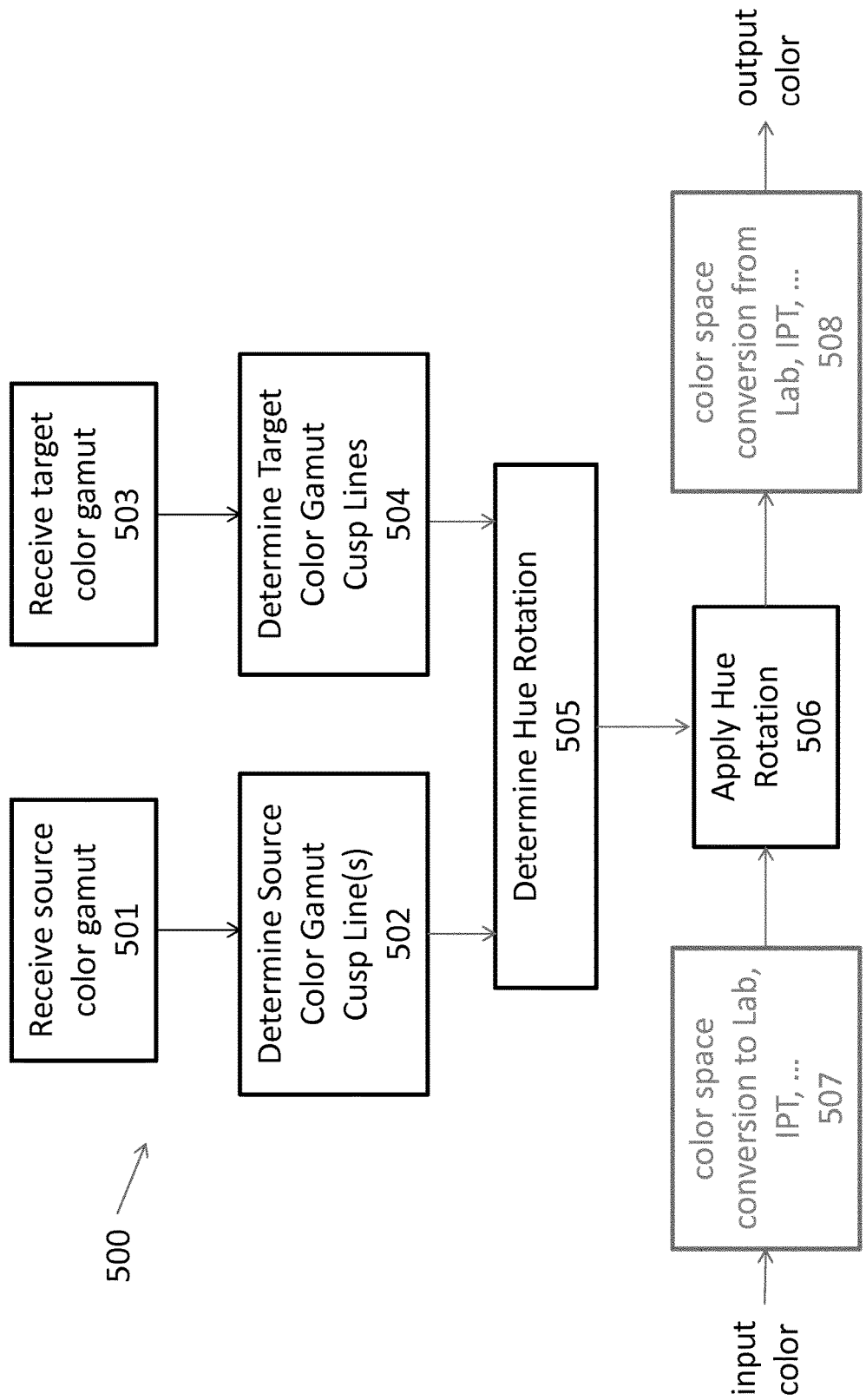
FIG. 5 illustrates an exemplary method in accordance with present principles.

In one example, advantages of present principles can include the ability to preserve artistic intent as moderate hue shift is applied in most cases, and maximum hue shift is only applied when needed. Another advantage includes preservation of color neighborhood increasing the uniformity of the saturation gain of a cusp gamut mapping FIG. 5 illustrates a flow diagram illustrating a method 500 for hue mapping in accordance with present principles. In one example, method 500 is directed to performing hue rotation mapping of a source color gamut towards a target color gamut. Method 500 may include changing the hue of the colors of the source color gamut.

Method 500 may include a block 501 for receiving information regarding a source color gamut. Block 501 may receive source color gamut information, e.g., information identifying the entire color gamut. In another example, block 501 may receive an identifier that identifies stored color gamut information (e.g., an indicator that identifies pre-stored color gamut information). The received source color gamut information may be information that identifies the source color gamut. The source color gamut could be limited to the coordinates of primary colors, secondary colors, the white point, gamut boundary description, coordinates of some colors, the cusp line, cusp points, etc. The source color gamut can be represented in any defined color space (e.g., RGB, XYZ, Lab, and IPT). The source color gamut may be received from any source (e.g., from a device delivering the input content, such as a camera, a set top box, a camera sensor, a HDMI receiver, a communication interface, a mobile network (including 3G or 4G network), a wireless network (including Wi-Fi, Bluetooth network or links), a TV Broadcast network (e.g. DVB or ATSC receiver interface), a wired network (including web network), a wired link or bus (including HMDI, USB), an optical disk player (including DVD or Blu-Ray player, a video stream or a storage medium (e.g. a Blu-Ray Disk, a memory)). The source color gamut may alternatively or in addition be compliant with a standard (e.g. rec.709, rec.2020)).

Block 502 may determine the cusp line of the received source color gamut. Block 502 may determine each cusp point for each hue. In one example, block 502 may determine, for each hue, the color with the maximum saturation. Block 502 may represent the cusp line as a saturation per hue. In another example, block 502 may represent the cusp line based on 3D coordinates of the cusp points.

Method 500 may further include a block 503 for receiving information regarding a target color gamut. Block 503 may receive target color gamut information, e.g., information identifying the entire color gamut. In another example, block 503 may receive an identifier that identifies stored color gamut information (e.g., an indicator that identifies pre-stored color gamut information). The received target color gamut information may be information that identifies the target color gamut. The target color gamut could be limited to the coordinates of primary colors, secondary colors, the white point, gamut boundary description, coordinates of some colors, the cusp line, cusp points, etc. The target color gamut can be represented in any defined color space (e.g., RGB, XYZ, Lab, and IPT). The target color gamut may be transmitted from any device/system (e.g., from a device that will display the content such as a television, a monitor, a smartphone, a tablet, a laptop, a gaming interface, or any other type of display, a communication interface, a destination interface, or a communication link (e.g. Wi-Fi, USB) or wired Link (e.g. HDMI, local area network)). The target color gamut may alternatively or in addition be a color gamut that is compliant with a standard (e.g. rec.709, rec.2020)). The target color gamut may be transmitted and/or received via a destination interface, e.g. an interface with a display or a communication link (including wireless (e.g. Wi-Fi, USB) or wired Link (e.g. HDMI, local area network).

In one example, the color space of the target color gamut may be different than the color space of the source color gamut. In one example, the target color gamut information may be received from a different device/system than the source color gamut information.

Block 504 may determine the cusp line(s) of the target color gamut. Block 504 may determine the cusp line in accordance with principles described in connection with block 502.

Block 505 may determine hue rotation angles. In one example block 505 may determine hue rotation angles based on primary colors. In another example, block 505 may determine hue rotation angles based on secondary colors. In one example of present principles, block 505 may determine hue rotation angles based on only primary colors. In another example of present principles, block 505 may determine hue rotation angles based on only secondary colors. In another example, block 505 may determine hue rotation angles based on both primary and secondary colors.

Block 505 may determine hue changes for each source color, and in particular for each specific color (i.e., primary and/or secondary color). As used herein, "specific colors" are defined as primary color(s), secondary color(s) or primary and secondary colors of a color gamut. Block 505 may determine hue changes of the specific colors of the source color gamut in the direction of the hue of the corresponding primary and/or the secondary color of the target color gamut. In one example, block 505 may determine hue changes by determining hue rotations that are defined by rotation angles.

In one example block 505 can determine hue changes, i.e., a hue rotation angle, for any hue, including hues of non-specific colors. In one example, block 505 may determine the hue rotation angle based on interpolation (e.g., linear, splines) of the hue rotation angles obtained for the primary and/or the secondary colors. In one example, the angle of rotation of colors other than specific colors may be determined by linear interpolation of the angle of rotation of the specific colors surrounding the hue angle of said specific colors in the source color gamut. Other interpolation methods could be used (e.g. spline interpolation). In one example, block 505 may perform such principles.

In another example, non-specific colors (colors other than primary and/or secondary colors) of the source color gamut may be rotated using a linear interpolation of the hue rotation angles of the adjacent primary (and optionally also the secondary) colors in the source color gamut. The hue rotation angle may be a piecewise linear function of hue. In one example, block 505 may perform this example.

In one example, block 505 may determine a look-up table ("LUT") for mapping input colors (e.g., colors from input images/video) to output colors (e.g., output images/video).

In one example, for each specific color (primary and/or secondary color), block 505 may determine, that larger hue rotation should be utilized when there is a smaller saturation difference. In another example, for each specific color (primary and/or secondary color), block 505 may determine, that larger hue rotation should be utilized when there is a larger hue difference (e.g., a difference between the hue of a source specific color and the hue of the corresponding target color).

In another example, for each specific color, block 505 may determine that a larger hue rotation should be utilized when there is a smaller lightness difference (e.g., a difference between the lightness of a source color and the lightness of a target color).

In another example, for each specific color, block 505 may determine that a larger hue rotation should be utilized when there is a larger lightness difference (e.g., a difference between the lightness of a source color and the lightness of a target color).

In one example, block 505 may determine angles of hue rotation, where the value of the angle of hue rotation for the specific colors increases when the difference in saturation between the specific colors of the source color gamut and the corresponding specific colors of the target color gamut decreases (i.e., the angle of rotation increases when the saturation difference decreases, although not necessarily at the same rate).

In one example, block 505 may determine angles of hue rotation, where the value of the angle of hue rotation for the specific colors increases when the difference in hue between the specific colors of the source color gamut and the corresponding specific colors of the target color gamut increases (i.e., the angle of rotation increases when the hue difference increases, although not necessarily at the same rate).

Block 505 may determine hue rotation angles for the primary and/or the secondary colors in accordance with the principles described in connection with Equation Nos. 1-7.

Block 506 may apply hue rotation based on the determinations of block 505. In one example, block 506 may apply hue rotation based on the hue rotation angles from block 505. In one example, block 506 may generate an LUT based on applying the hue rotation determinations from block 505 to each input color to determine an output color. In another example, block 506 may apply hue rotation based on an LUT that was previously determined in accordance with present principles, including the hue rotation determinations of block 505. Once an LUT is generated in accordance with present principles, it may be stored for future application without performing the determinations of blocks 501-505. The LUT may be generated in accordance with the principles described in connection with blocks 501-505 and Equations Nos. 1a-12b.

Block 506 may receive input color information. The input color information may be color information of input pixels of the input video. In one example, block 506 may determine an output color that is determined based on the rotated hue. Block 506 may then provide the output color.

In one example, blocks 507 and 508 may apply color space conversion to input or output color (e.g., pixels). The color conversion may be performed in the same step or the same process as the hue rotation. The color space conversion may change the representation of a color from a first color space to another color space. In one example, blocks 507 and 508 may be optional. In one example, blocks 507 and 508 may apply color space conversion based on color space representation of an LUT. In another example, blocks 507 and 508 may apply color space conversion based on the color space used to perform the hue rotation. Method 500 discusses an example of performing aspects of present principles in a color space such as Lab or IPT. In such color space, the modification of hue corresponds to a rotation of colors.

Method 500 may be modified for other implementations, such as implementations utilizing LUTs that modify the hue. For example if method 500 is modified to utilize LUTs, block 506 may implement the LUT. In this example, blocks 501-505 may not be utilized or may be utilized to generate the LUT.

In one example of present principles, a hue rotation angle (θ) may be determined as follows. The following example may be implemented by block 505 of FIG. 5. A variable a may be defined as the hue angle difference of a given specific color P. The variable a may be defined as follows:

$$\alpha = \overrightarrow{P_t O P_s} \qquad \text{Equation No. (1a)}$$

As defined herein with regard to Equation No. (1), the point $P_s$ is a specific color of the source color gamut and the point $P_t$ is the corresponding color of the target color gamut.

The point O corresponds to the origin the color plane (e.g. ab plane in Lab color space or PT space in IPT color space). For example, the point O may correspond to the neutral gray axis (e.g. the luminance, the lightness or the intensity axis).

Variables β and γ may be the two other angles of the triangle $OP_sP_t$, which may be defined as follows:

$$\beta = \overrightarrow{OP_tP_s} \qquad \text{Equation No. (1b)}$$

$$\gamma = \overrightarrow{OP_tP_s}. \qquad \text{Equation No. (1c)}$$

An aspect of present principles relates to defining the hue rotation angle (θ) as follows:

$$\theta = \alpha * \cos\left(\frac{\gamma - \beta}{2}\right). \qquad \text{Equation No. (2)}$$

When the saturation difference decreases, the difference between angles β and γ also decreases (the values angles β and γ become closer). When the difference of the angles β and γ decreases, the value of the cosine of Equation No. (2) increases. Thus, when using Equation No. (2), the hue rotation angle (θ) increases (in absolute value) with the decreasing difference of saturation between the specific color in the source color gamut and the corresponding color in the target color gamut.

Likewise, when the hue angle difference, α, increases, the values of angles β and γ become closer. When the difference of the angles β and γ decreases, the value of the cosine of Equation No. (2) increases and becomes closer to 1, and the value of rotation angle θ increases and becomes closer to the value of α. Thus when using Equation No. (2), the hue rotation angle (θ) increases and gets closer to a with the increasing difference of hue angle between the specific color in the source color gamut and the corresponding specific color in the target color gamut.

When the rotation angle θ equals α, (θ=α), there is full hue rotation of the source primary and/or secondary color.

In an illustrative example, Equations Nos. (1a)-(1c) may have the following values for variables α, β and γ:

$$\alpha = 10°; \qquad \text{Equation No. (3a)}$$

$$\beta = \overrightarrow{OP_tP_s} = 25°; \qquad \text{Equation No. (3b)}$$

$$\gamma = \overrightarrow{OP_tP_s} = 145° \qquad \text{Equation No. (3c)}$$

Applying Equation No. (2) for the values of variables α, β and γ in Equations Nos. (3a)-(3c) may yield the following results:

$$\theta = \alpha * \cos\left(\frac{\gamma - \beta}{2}\right) = 10° * \cos\left(\frac{145° - 25°}{2}\right) = 5° \qquad \text{Equation No. (4)}$$

This example, as well as the principles described in connection with Equations Nos. (1a)-(4) may be performed by block 505 of method 500 illustrated in FIG. 5.

Figure 8:
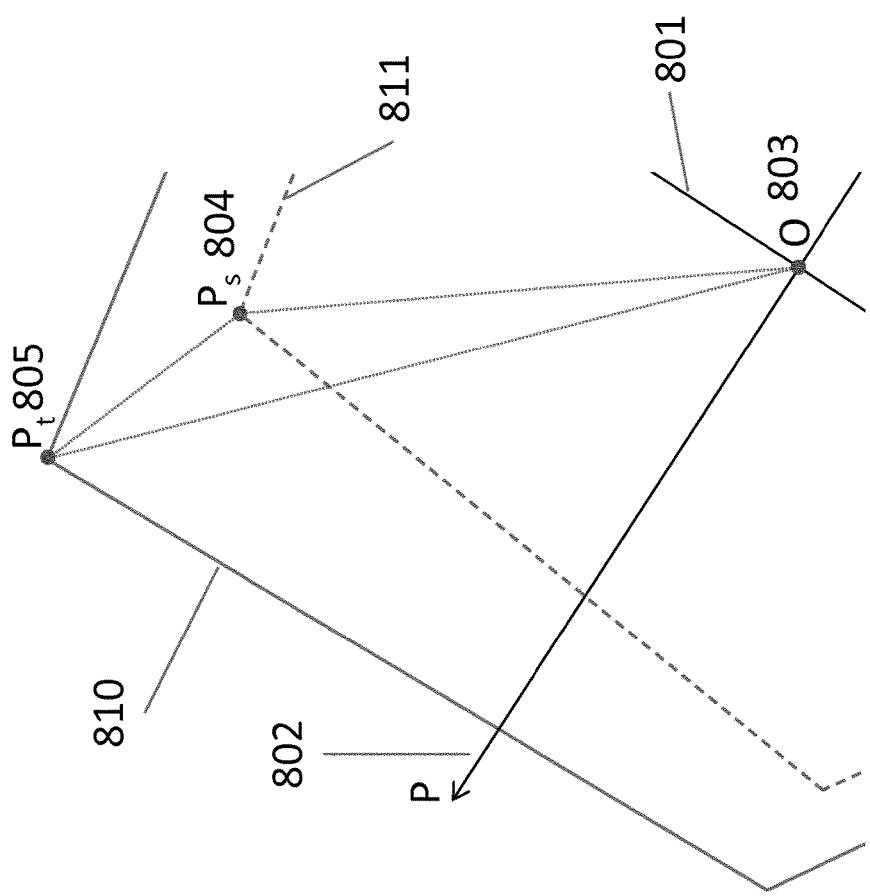
FIG. 8 illustrates an exemplary portion of a hue rotation mapping.

FIG. 8 illustrates an exemplary section of a hue mapping rotation, including a cusp of the source color gamut and a cusp of the target color gamut. FIG. 8 further illustrates T axis 801 of IPT color space, P axis 802 of IPT color space, and point O 803, which corresponds to the origin the color plane PT of IPT color space. FIG. 8 further illustrates a point $P_s$ 804, which is a specific color (i.e., a primary or secondary color) of the source color gamut, a point $P_t$ 805, which is a specific color (i.e., a primary or secondary color) of the target color gamut corresponding to the point $P_s$ 804. FIG. 8 further illustrates a line 810 corresponding to the cusp of a source color gamut and a line 811 corresponding to the cusp of a target color gamut. As can be seen in FIG. 8, the triangle $OP_sP_t$ is visible, thereby the angle $\alpha$, $\beta$ and $\gamma$, of Equations Nos. (1a)-(1c) and (3a)-(3c), are implicitly visible.

In another example, the variables $\alpha$, $\beta$ and $\gamma$ may be defined as follows.

$$\alpha = 10°; \qquad \text{Equation No. (5a)}$$

$$\beta = \widehat{OP_tP_s} = 52°; \qquad \text{Equation No. (5b)}$$

$$\gamma = \widehat{OP_tP_s} = 118° \qquad \text{Equation No. (5c)}$$

In this example, determining the hue rotation angle based on Equation No. (2) yields the following:

$$\theta = \alpha * \cos\left(\frac{\gamma - \beta}{2}\right) = 10° * \cos\left(\frac{118° - 52°}{2}\right) = 8.4° \qquad \text{Equation No. (6)}$$

While $\alpha=10°$, the value of the saturation of the primary color point $P_s$ and the saturation of the corresponding primary color point $P_t$ are much closer than in the prior example. That is, the value of the hue rotation angle ($\theta$) is larger (compare Equation No. (6) with Equation No. (4)). This increase illustrates that the hue rotation angle ($\theta$) increases when the saturations of the primary colors are closer to each other.

It will be appreciated that other formulas could be used, leading to similar effects. An example of another formula leading to similar effects is:

$$\theta = \alpha * \sin\left(2 * \arctan\left(\frac{S_t}{S_s}\right)\right) * \sin|\alpha| \qquad \text{Equation No. (7)}$$

In Equation No. 7, the variable $S_s$ is the saturation of a specific color (e.g., a primary or secondary color) of the source color gamut $P_s$ and the variable $S_t$ is the saturation of this specific color of the target color gamut $P_t$.

For a steeper effect, an exponent (bigger than 1) can be used to determine the hue rotation angle ($\theta$), for example $$\theta = \alpha * \cos^2\left(\frac{\gamma - \beta}{2}\right). \qquad \text{Equation No. (8)}$$

This example, as well as the principles described in connection with Equations Nos. (5)-(8) may be performed by block 505 of FIG. 5.

Figure 9:
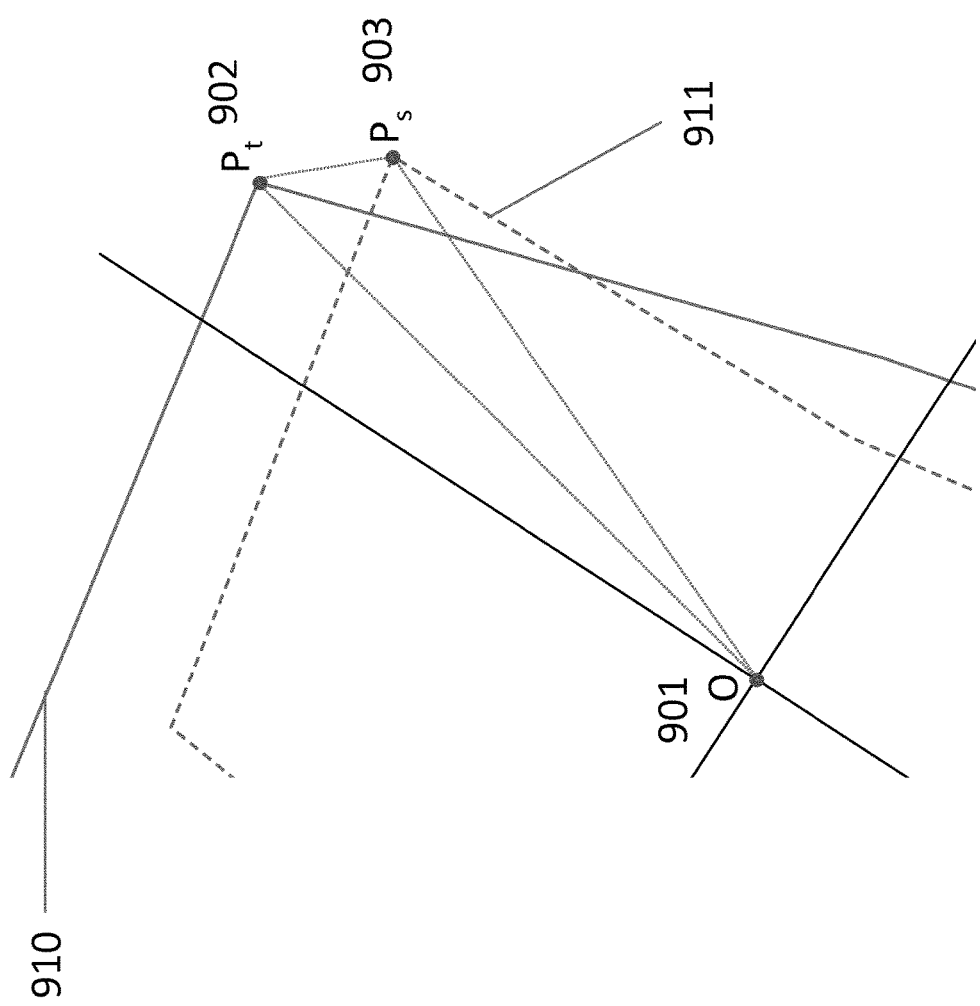
FIG. 9 illustrates an exemplary portion of a hue rotation mapping.

FIG. 9 illustrates another example of a hue mapping. FIG. 9 illustrates a cusp of the source color gamut and a cusp of the target color gamut. FIG. 9 illustrates a point O 901, which corresponds to the origin the color plane PT of IPT color space. FIG. 9 further illustrates a point $P_s$ 902, which is a specific color (i.e., a primary or secondary color) of the source color gamut, a point $P_t$ 903, which is a specific color (i.e., a primary or secondary color) of the target color gamut corresponding to $P_s$. FIG. 9 further illustrates a line 910 corresponding to the cusp of a source color gamut and a line 911 corresponding to the cusp of a target color gamut. As can be seen in FIG. 9, the triangle $OP_sP_t$ is visible, thereby the angles $\alpha$, $\beta$ and $\gamma$, of Equations Nos. 5a-5c, are implicitly visible.

Another example illustrates a numerical application of a hue mapping from rec. 2020 (source gamut) to rec. 709 (target gamut) in the Lab color space in accordance with present principles. This example may also be implemented by block 505 of FIG. 5. In this example, the coordinates of the primary and the secondary colors of the source color gamut of rec. 2020 in the cylindrical representation of the Lab color space are:

rec.2020 Red (primary color): Hue angle=40.58° Chroma=154.49 rec.2020 Yellow (secondary color): Hue angle=98.92° Chroma=138.56 rec.2020 Green (primary color): Hue angle=145.91° Chroma=208.07 rec.2020 Cyan (secondary color): Hue angle=190.31° Chroma=107.98 rec.2020 Blue (primary color): Hue angle=305.60° Chroma=147.92 rec.2020 Magenta (secondary color): Hue angle=334.89° Chroma=144.16

The coordinates of the primary and the secondary colors of the target color gamut of rec.709 in the cylindrical representation of the Lab color space are:

rec.709 Red (primary color): Hue angle=40.00° Chroma=104.55 rec.709 Yellow (secondary color): Hue angle=102.85° Chroma=96.91 rec.709 Green (primary color): Hue angle=136.01° Chroma=119.78 rec.709 Cyan (secondary color): Hue angle=196.38° Chroma=50.11 rec.709 Blue (primary color): Hue angle=306.29° Chroma=133.81 rec.709 Magenta (secondary color): Hue angle=328.23° Chroma=115.55

Angles $\alpha$, $\beta$ and $\gamma$ may generally be determined based on the coordinates of the primary and the secondary colors. For example, for each specific color (i.e. each primary and for each secondary color), an angle ($\alpha = \widehat{P_tOP_s}$) and two sides ($OP_s$ and $OP_t$) of the triangle ($OP_sP_t$) composed of the corresponding colors ($P_s$ and $P_t$) in each color gamut and the ab plane origin (O) may be determined. The angle $\alpha = \widehat{P_tOP_s}$ is equal to the hue angle difference of the corresponding colors. The sides of the triangle are equal to the chroma of the corresponding colors. Block 505 may rely on this information in its determinations.

In one example, applying these principles to the Green primary colors, it can be determined that $\alpha = \widehat{P_tOP_s} = 136.01° - 145.91° = 9.90°$, and the two adjacents sides are equal to 208.07 and 119.78. Using the law of cosines, the two other angles ($\beta = \widehat{OP_tP_s}$ and $\gamma = \widehat{OP_tP_s}$) of each triangle ($OP_sP_t$) can be determined:

$$\beta = \arccos\left(\frac{OP_t - OP_s * \cos(\alpha)}{P_sP_t}\right) \qquad \text{Equation No. (9a)}$$

$$\gamma = \arccos\left(\frac{OP_s - OP_t * \cos(\alpha)}{P_sP_t}\right) \qquad \text{Equation No. (9b)}$$

where $$P_sP_t = \sqrt{OP_s^2 + OP_t^2 - 2 * OP_s * OP_t * \cos(\alpha)} \qquad \text{Equation No. (10)}$$

For example for the Green primary colors:

$$P_s P_t = \sqrt{208.07^2 + 119.78^2 - 2*208.07*119.78*\cos(9.90°)}$$ Equation No. (11a)

$$P_s P_t = 92.40$$

$$\beta = arcos\left(\frac{119.78 - 208.07*\cos(9.90°)}{92.40}\right)$$ Equation No. (11b)

$$\beta = 157.22°$$

$$\gamma = arcos\left(\frac{208.07 - 119.78*\cos(9.90°)}{92.40}\right)$$ Equation No. (11c)

$$\beta = 12.88°$$

Utilizing Equation No. (2) to determine the hue rotation angle (θ) for the Green primary color results in:

$$\theta = \alpha * \cos\left(\frac{\gamma - \beta}{2}\right)$$ Equation No. (12a)

$$\theta = -9.90° * \cos\left(\frac{12.88° - 157.22°}{2}\right)$$ Equation No. (12b)

$$\theta = -3.03°$$

Applying the same equations to the other primary and secondary colors leads to the following results:
rec.2020 Red: Hue rotation angle=−0.02°
rec.2020 Yellow: Hue rotation angle=0.75°
rec.2020 Green: Hue rotation angle=−3.03°
rec.2020 Cyan: Hue rotation angle=0.87°
rec.2020 Blue: Hue rotation angle=0.08°
rec.2020 Magenta: Hue rotation angle=−3.10°

Figure 6:
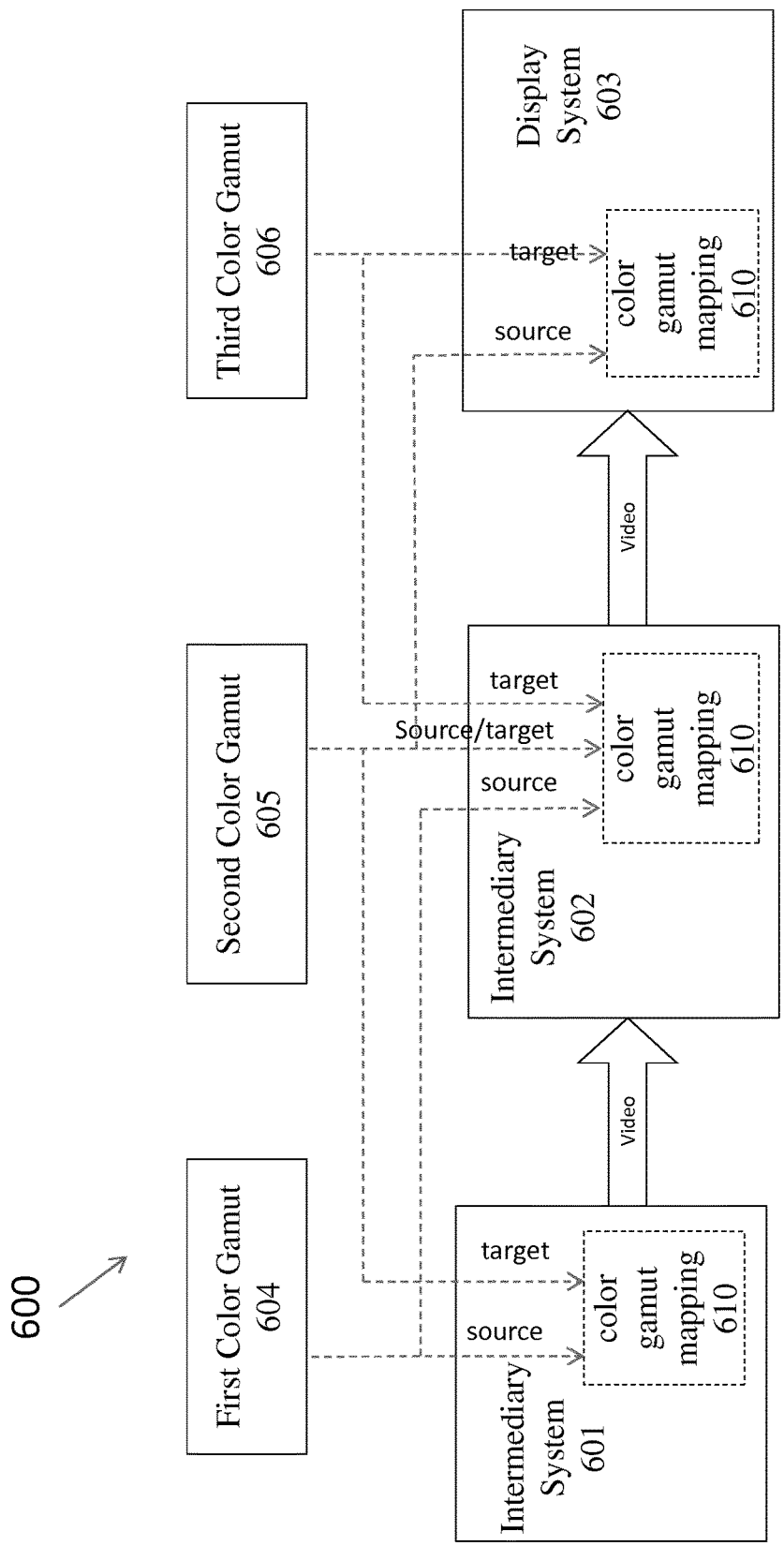
FIG. 6 illustrates an exemplary system in accordance with present principles.

FIG. 6 illustrates an exemplary system 600 in accordance with present principles. The system 600 may include one or more of intermediary system 601, intermediary system 602 and display system 603. As it can be appreciated, system 600 may include only one of these systems 601-603. Alternatively, system 600 may include some or all of the systems 601-603. Alternatively, system 600 may include additional or different systems for performing color gamut mapping other than systems 601-603. In one example, each of the systems 601-603 may be a device similar to device 700 of FIG. 7. Alternatively, each of the systems 601-603 may be implemented in whole or in part with device 700 of FIG. 7.

System 600 illustrates first color gamut 604, second color gamut 605, and third color gamut 606. It can be appreciated however, that one or more of these color gamuts 604-606 may be optional. Or one or more of the color gamuts 604-606 may be included, or different color gamuts than the examples provided herein may be further included.

Each of the color gamuts 604-606 may be received or may be signaled. Additionally, as used herein, the word "signal" refers to indicating something, e.g., information of a stored color gamut or color gamut mapping information. For example, a system may receive a signal identifying a known color gamut (e.g., a standardized color gamut). A system may signal one or more parameters relating to a color gamut in order to make a system aware of which color gamut is utilized on the color gamut mapping system side. In this way, parameters or identifiers may be utilized to identify color gamuts. By avoiding transmission of any actual parameters, savings may be realized. It is to be appreciated that signaling may be accomplished in a variety of ways. For example, one or more syntax elements, flags, and so forth may be used to signal information.

Each of the color gamuts 604-606 may correspond to color gamuts, such as the color gamuts of a display panel, of a camera, of present or future color gamut standards (e.g., NTSC, rec. 709, rec. 2020, Adobe RGB, and DCI-P3). The color gamuts 604-606 may be received from any device/system (e.g., from a device delivering the input content, such as a camera, a set top box, a Blu-ray player, a camera sensor, a HDMI receiver, a communication interface). The color gamuts may alternatively or in addition be compliant with a standard (e.g. rec.709, rec.2020)). The color gamuts may be received via any medium (e.g., a mobile network (including 3G or 4G network), a wireless network (including Wi-Fi, Bluetooth network or links), a TV Broadcast network (e.g. DVB or ATSC receiver interface), a wired network (including web network), a wired link or bus (including HMDI, USB), an optical disk player (including DVD or Blu-Ray player, a video stream or a storage medium (e.g. a Blu-Ray Disk, a memory).

Each of the systems 601-603 may include a color gamut mapping block 610. The color gamut mapping block 610 may perform color gamut mapping in accordance with the principles described in connection with FIG. 5 and Equation Nos. 1a-12b. The color gamut mapping 610 may be performed locally or may be performed in whole or in part remotely (e.g., on a server, in the cloud).

In one example, intermediary system 601 may be a camera. The intermediary system 601 may perform color gamut mapping 610 in accordance with present principles to map a camera sensor color gamut to another color gamut (e.g., a standardized color gamut, or the color gamut of the camera display). In one example, intermediary system 601 may be a broadcaster encoder. The intermediary system 601 may perform color gamut mapping 610 in accordance with present principles to map a color gamut of the original video content (e.g., a standardized color gamut like rec. 2020) to a color gamut of the transmission channel (e.g., a standardized color gamut like rec. 709). In one example, intermediary system 602 may be a set-top box system, a video recorder, or a Blu-ray player for performing color gamut mapping between two different standards (e.g. NTSC, rec. 709, rec. 2020, Adobe RGB, and DCI-P3). As shown in FIG. 6, the source color gamut, the target color gamut or both the source and target color gamut may be provided to intermediary system 602. In one example, there may be multiple intermediary systems 602 that may perform color gamut mapping during the transmission/reception of color gamut information. In one example, display system 603 may be a display. The display system 603 may perform color gamut mapping 610 in accordance for present principles to map the color gamut of the video content (e.g. utilizing rec. 2020) to the color gamut of the physical display panel (e.g. defined by its primary and the secondary colors).

Alternatively, each of the systems 601-603 may apply an LUT that was determined in accordance with the principles described in connection with FIG. 5 and Equation Nos. 1a-12b. The LUT may be determined based on hue rotation in accordance with present principles. In this particular case, the hue rotation angle for the specific colors (e.g. primary colors and/or secondary colors) may be obtained utilizing Equation Nos. 1a-12b. During the generation of the LUT, each possible color input of the LUT may be provided as input to the apply hue rotation (e.g., block 506 of FIG. 5).

The output of the apply hue rotation is then stored in the LUT as corresponding to the possible color input.

In one example, during the generation of the LUT, depending on the format of the LUT input (e.g. RGB or YUV, 8 bit, 12 bit or 16 bit), each possible LUT input color value may be optionally first converted (e.g., block 507) to the working color space (e.g. Lab or IPT). The hue rotation angle may then be determined for each possible LUT input value. The hue rotation may then be applied (e.g., block 506) to the color before the optional conversion (e.g., block 508) to the LUT output color space (e.g. Lab, IPT, RGB, or YUV). The output color value may be known as the LUT result and may be stored in the LUT. The LUT input may have a smaller resolution than the actual system input and the missing information may be interpolated before applying the LUT. Thus, the LUT provides a mapping of input LUT colors to resulting LUT processed colors, where the resulting LUT colors are processed in accordance with present principles, including the principles described in connection with Equation Nos. 1a-12b and FIG. 5.

Figure 7:
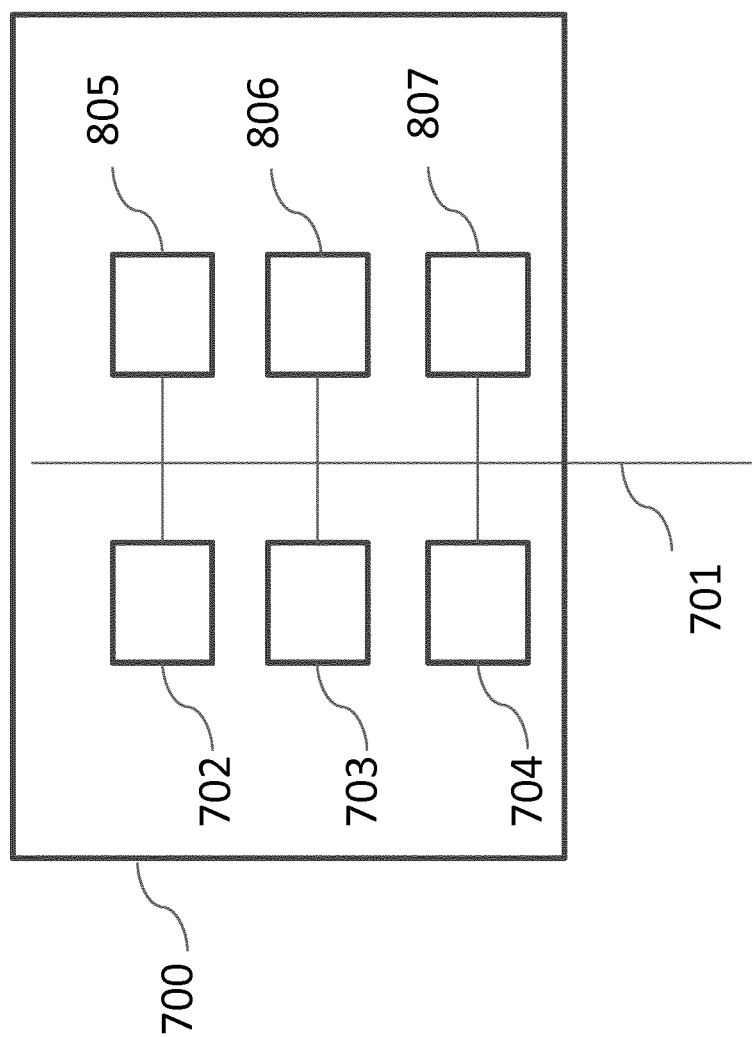
FIG. 7 illustrates an exemplary device in accordance with present principles.

FIG. 7 represents an exemplary architecture of a device 700 which may be configured to implement methods described in relation with FIG. 5 and Equation Nos. 1a-12b. The present principles may be performed locally or may be performed in whole or in part remotely (e.g., on a server, in the cloud). As described above, device 700 may be part of one or more systems 601-603 of FIG. 6.

In one example, FIG. 7 represents an apparatus that may be configured to implement the color processing methods according to present principles.

Device 700 comprises following elements that are linked together by a data and address bus 701:
- a microprocessor 702 (or CPU), which is, for example, a DSP (or Digital Signal Processor);
- a ROM (or Read Only Memory) 703;
- a RAM (or Random Access Memory) 704;
- an I/O interface 705 for reception of data to transmit, from an application; and
- a battery 706 (or other suitable power source).

According to an example, the battery 706 is external to the device. In each of mentioned memory, the word «register» used in the specification can correspond to area of small capacity (some bits) or to very large area (e.g. a whole program or large amount of received or decoded data). ROM 703 comprises at least a program and parameters. Algorithm of the methods according to the invention is stored in the ROM 703. When switched on, the CPU 702 uploads the program in the RAM and executes the corresponding instructions.

RAM 704 comprises, in a register, the program executed by the CPU 702 and uploaded after switch on of the device 700, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device.

Processors also include communication devices, such as, for example, computers, cell phones, portable/personal digital assistants ("PDAs"), and other devices that facilitate communication of information between end-users. The system 700 may include memory 703 and/or 704 and processor(s) 702. In one example, the processor 702 may perform the operations described in connection with FIG. 5. In one example, the memory 703 and/or 704 may store data related to the operations described in connection with FIG. 5.

Figure 10:
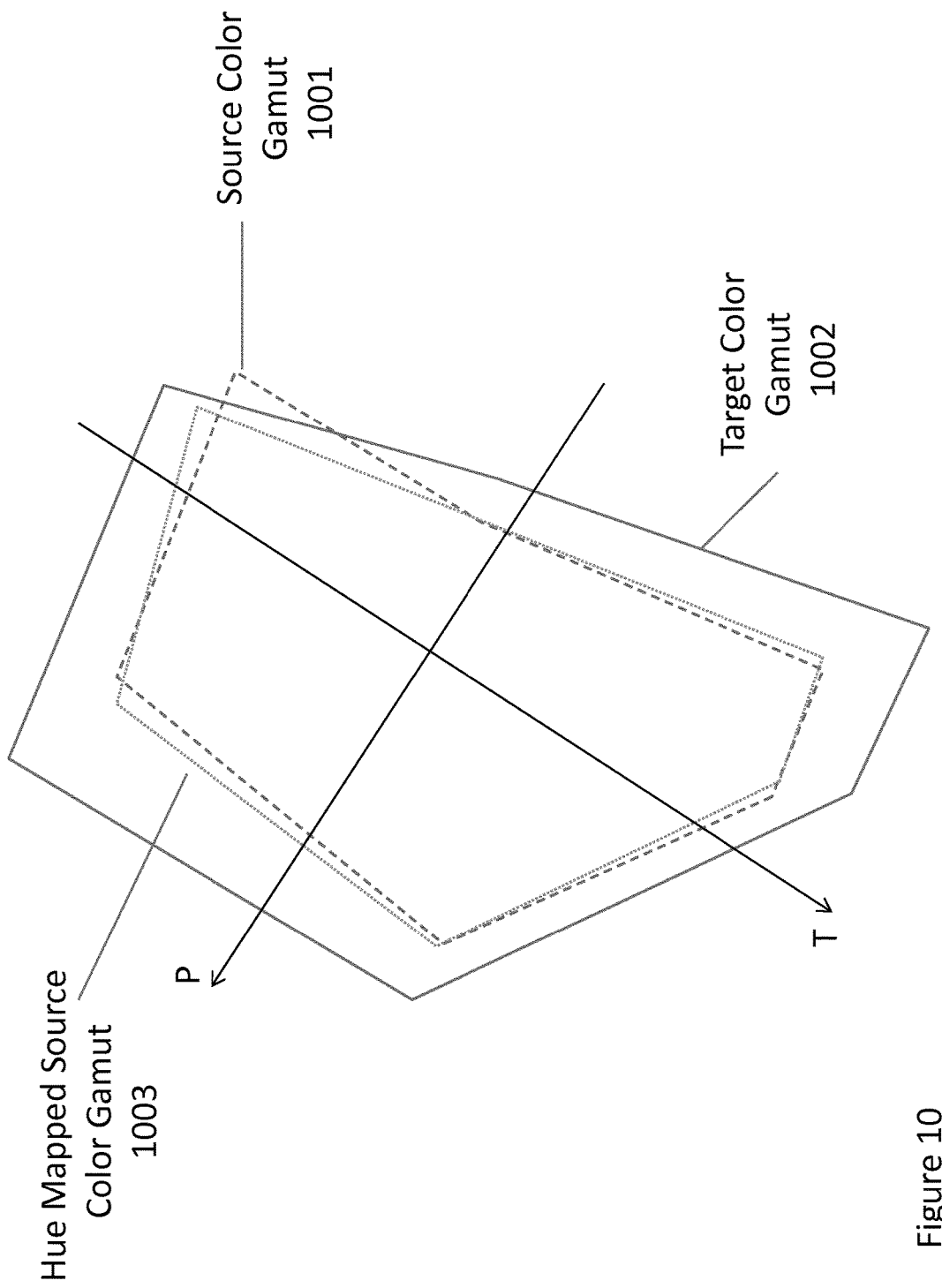
FIG. 10 illustrates an exemplary color gamut mapping in accordance with present principles.

FIG. 10 illustrates an exemplary hue rotation mapping in accordance with present principles. FIG. 10 includes the cusp of a source color gamut 1001, the cusp of a target color gamut 1002, and the cusp of a hue mapped source gamut 1003. The hue mapped source gamut 1003 is mapped in accordance with present principles, including the principles described in connection with FIG. 5 and Equation No. (2). The P and T axes are the two chromatic axis of the IPT color space. The hue mapped source gamut 1003 is the result of applying Equation No. (2) to determine the hue rotation angle for each specific source color (each primary and secondary color of the source color gamut), and applying rotations to specific colors (primary and secondary colors) of the source color gamut using these determined hue rotation angles to compute the position of the hue rotated primary and secondary colors. The position of the other cusp points are linearly interpolated from the hue rotated primary and secondary colors.

Figure 11:
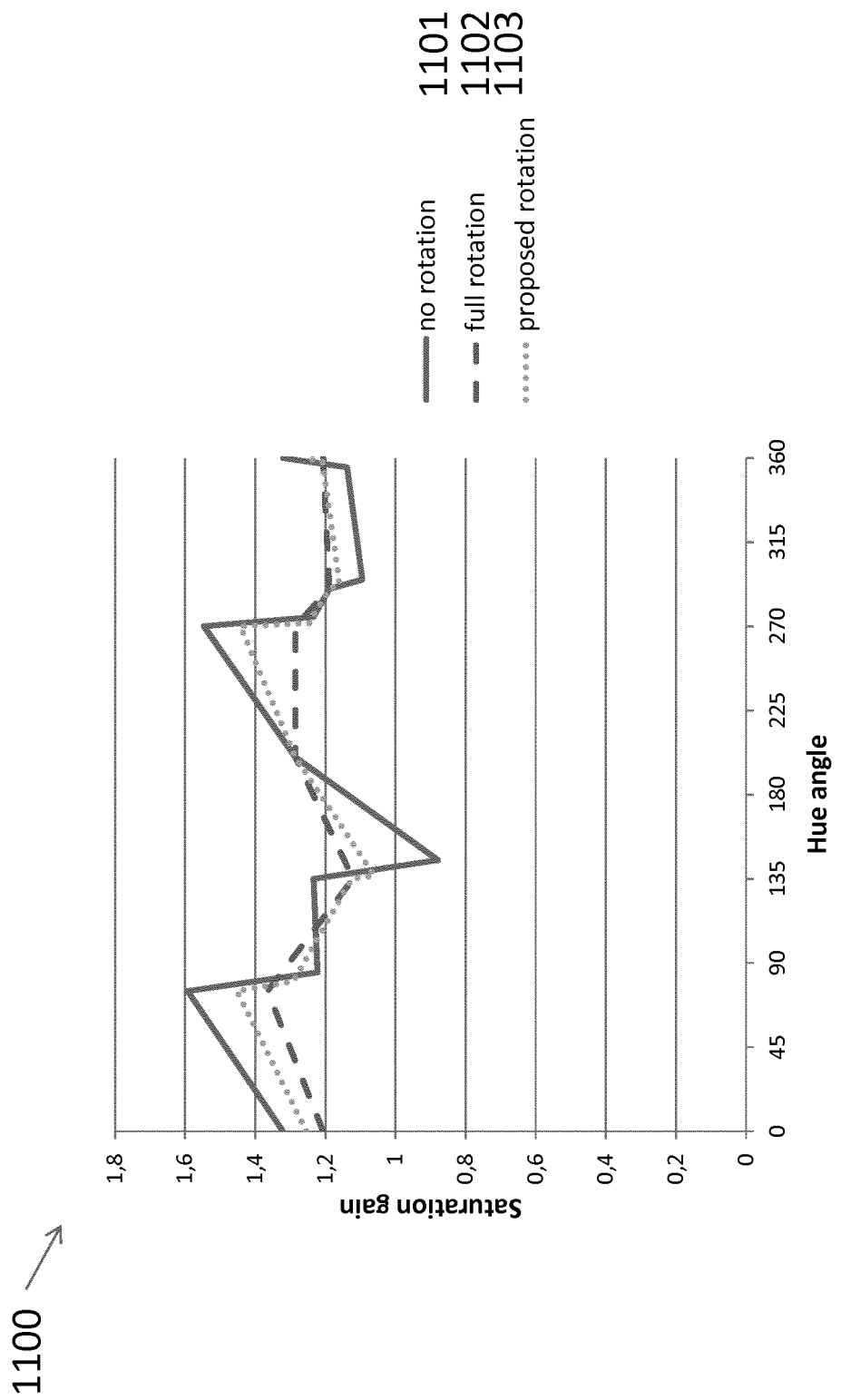
FIG. 11 illustrates an exemplary plot diagram of saturation gain in accordance with present principles.

FIG. 11 illustrates an exemplary plot diagram 1100 of saturation gain resulting from cusp color gamut mapping with or without the full hue rotation or with the proposed rotation in accordance with present principles. The plot diagram 1100 illustrates the change of saturation (i.e., saturation gain) that is induced by cusp color gamut mapping. The vertical axis of the plot diagram 1100 pertains to a ratio of saturation gain. The horizontal axis of the plot diagram 1100 pertains to hue angle measured in degrees. Plot diagram 1100 includes a plot line 1101 that demonstrates the saturation gain versus hue angle when there is no hue rotation. Plot line 1101 relates to mapping the source color gamut to the target color gamut (without hue rotation). Plot diagram 1100 further includes a plot line 1102 that demonstrates the saturation gain versus hue angle when there is a full hue rotation. Plot line 1102 relates to mapping the source color gamut (using full hue rotation) to the target color gamut. Plot diagram 1100 also includes a plot line 1103 that demonstrates the saturation gain versus hue angle when hue rotation in accordance with present principles (the proposed hue rotation) is used. Plot line 1103 relates to mapping the source color gamut (using the proposed hue rotation) to the target color gamut.

Figure 12:
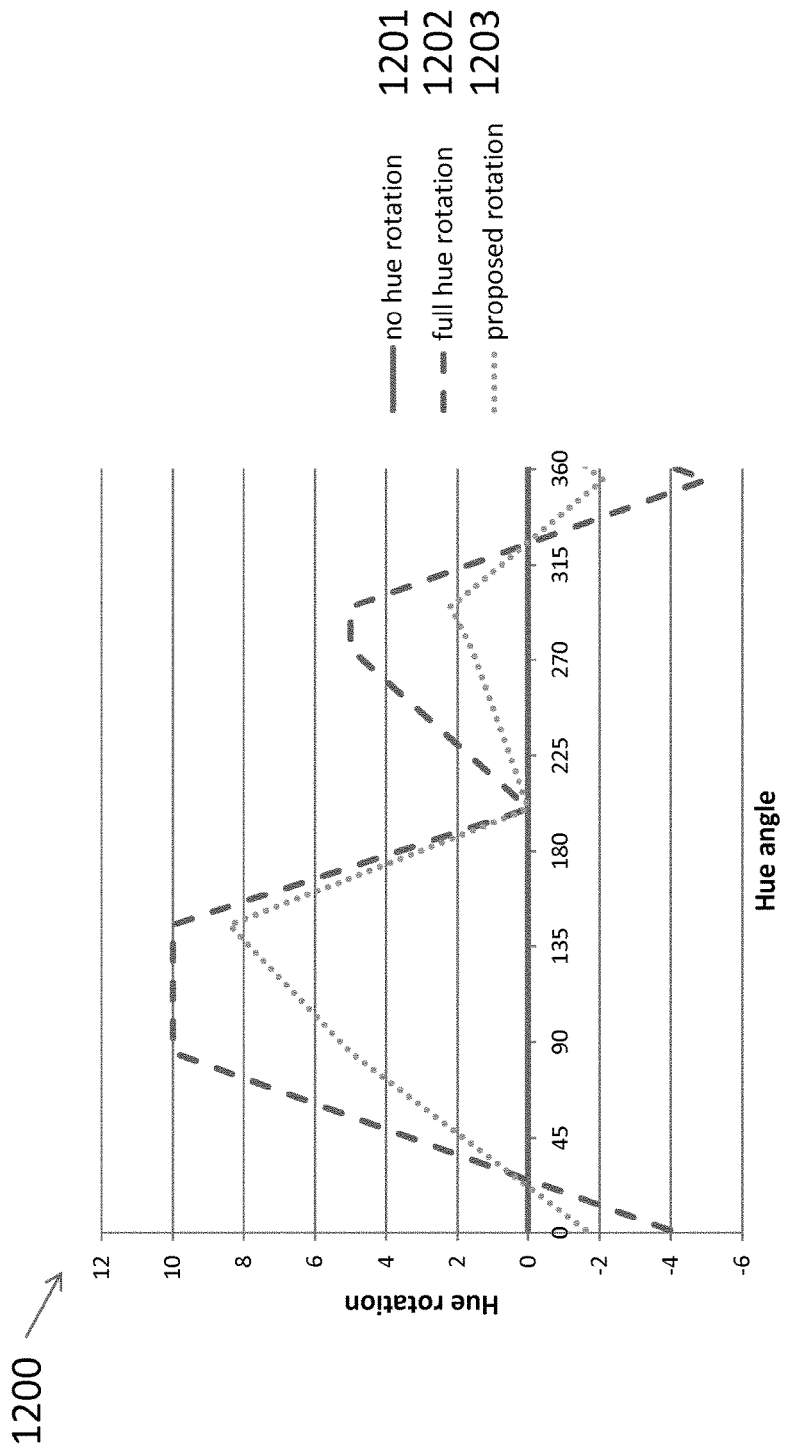
FIG. 12 illustrates an exemplary plot diagram of hue rotation in accordance with present principles.

FIG. 12 illustrates an exemplary plot diagram 1200 of the hue rotation resulting from a color gamut mapping with or without the full hue rotation. Plot diagram 1200 illustrates the hue rotation (change of hue) that is induced by mapping of the source color gamut to the target color gamut. The vertical axis of the plot diagram 1200 pertains to hue rotation angle in degrees. The horizontal axis of the plot diagram 1200 pertains to hue angle in degrees. Plot diagram 1200 includes a plot line 1201 that demonstrates the hue rotation angle versus hue angle when there is no hue rotation. Plot diagram 1200 includes a plot line 1202 that demonstrates the hue rotation angle versus hue angle when there is a full hue rotation. Plot diagram 1200 further includes a plot line 1203 that demonstrates the hue rotation angle versus hue angle when there is the proposed hue rotation.

As can be seen from FIGS. 11 and 12, the saturation gain is more uniform when applying the hue rotation as proposed in the present invention (1103), than when applying no hue rotation (1101). But also when applying the hue rotation as proposed in the present invention (1203) the colors do not get as shifted as when applying the full hue rotation (1202).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included.

Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

While the present invention is described with respect to a particular embodiment, it is understood that the present invention is not limited to this embodiment. The present invention as claimed therefore includes variations from this embodiment described herein, as will be apparent to one of skill in the art.

It is to be further understood that, because some of the constituent system components and methods depicted in the accompanying drawings are preferably implemented in software, the actual connections between the system components or the process function blocks may differ depending upon the manner in which the invention is implemented.

The invention claimed is:

1. A method for gamut mapping source colors into target colors from a source color gamut towards a target color gamut, comprising:
   adaptively changing a source hue of at least one source specific color towards a target hue of a corresponding target specific color based on a difference a between a hue of this source specific color and a hue of this target specific color to determine a mapped specific color;
   performing color gamut mapping for the source colors of the source color gamut towards the target color gamut based on the mapped specific colors,
   wherein the specific colors are at least one selected from a group of primary colors, secondary colors, a group of primary colors and secondary colors,
   wherein said changing of hue is represented by a hue rotation angle $$\theta = \alpha * \cos\left(\frac{\gamma - \beta}{2}\right)$$

in a hue-chroma plane having an origin O defined by a zero chroma value in this plane, where, if said at least one source specific color and corresponding target specific color are represented respectively by ($P_s$) and ($P_t$) in said hue-chroma plane, $\alpha = \widehat{P_t O P_s}$, $\beta = \widehat{O P_t P_s}$, and $\gamma = \widehat{O P_s P_t}$.

2. The method for gamut mapping according to claim 1, further comprising determining the hue of at least one non-specific color by interpolation of changed hue values of the mapped specific source colors.

3. The method for gamut mapping according to claim 2, wherein said changed hue values used for said interpolation are adjacent to said at least one non-specific color.

4. A system for gamut mapping source colors into target colors from a source color gamut towards a target color gamut, comprising:
   a processor configured to adaptively change a source hue of at least one source specific color towards a target hue of a corresponding target specific color based on a difference a between a hue of this source specific color and a hue of this target specific color to determine a mapped specific color and to perform color gamut mapping for the source colors of the source color gamut towards the target color gamut based on the mapped specific colors,
   wherein the specific colors are at least one selected from a group of primary colors, secondary colors, a group of primary colors and secondary colors,
   wherein said changing of hue is represented by a hue rotation angle $$\theta = \alpha * \cos\left(\frac{\gamma - \beta}{2}\right)$$

in a hue-chroma plane having an origin O defined by a zero chroma value in this plane,
   where, if said at least one source specific color and corresponding target specific color are represented respectively by (Ps) and (Pt) in said hue-chroma plane,
   $\alpha = \widehat{P_t O P_s}$, $\beta = \widehat{O P_t P_s}$, and $\gamma = \widehat{O P_s P_t}$.

5. The system for gamut mapping according to claim 4, wherein the processor is further configured to determine the hue of at least one non-specific color by interpolation of changed hue values of the mapped specific source colors.

6. A system for gamut mapping according to claim 5, wherein said changed hue values used for said interpolation are adjacent to said at least one non-specific color.

7. A non-transitory computer readable storage medium comprising a computer program including a set of instructions executable by a processor, the instructions comprising:
   adaptively changing a source hue of at least one source specific color towards a target hue of a corresponding target specific color based on a difference a between a hue of this source specific color and a hue of this target specific color to determine a mapped specific color;
   performing color gamut mapping for the source colors of the source color gamut towards the target color gamut based on the mapped specific colors,
   wherein the specific colors are at least one selected from a group of primary colors, secondary colors, a group of primary colors and secondary colors, wherein said changing of hue is represented by a hue rotation angle $$\theta = \alpha * \cos\left(\frac{\gamma - \beta}{2}\right)$$

in a hue-chroma plane having an origin O defined by a zero chroma value in this plane, where, if said at least one source specific color and corresponding target specific color are represented respectively by (Ps) and (Pt) in said hue-chroma plane, $\alpha = \widehat{P_t O P_s}$, $\beta = \widehat{O P_t P_s}$, and $\gamma = \widehat{O P_s P_t}$.

8. The non-transitory computer readable storage medium according to claim 7, wherein the instructions comprise:
  determining the hue of at least one non-specific color by interpolation of changed hue values of the mapped specific source colors.

9. The non-transitory computer readable storage medium according to claim 8, wherein said changed hue values used for said interpolation are adjacent to said at least one non-specific color.

\* \* \* \* \*